US006351473B1

(12) United States Patent
Reusens et al.

(10) Patent No.: US 6,351,473 B1
(45) Date of Patent: Feb. 26, 2002

(54) METHOD TO ALLOCATE DATA BITS, MULTI-CARRIER TRANSMITTER AND RECEIVER USING THE METHOD, AND RELATED ALLOCATION MESSAGE GENERATOR

(75) Inventors: Peter Paul Frans Reusens, Laarne; Olivier Van De Wiel, Brussels, both of (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/007,865

(22) Filed: Jan. 15, 1998

(30) Foreign Application Priority Data

Jan. 15, 1997 (EP) .............................................. 97440003

(51) Int. Cl.[7] .................................................. H04J 1/00
(52) U.S. Cl. ...................................... 370/480; 370/529
(58) Field of Search ................................ 370/480, 481, 370/343, 319, 344, 436, 529, 201, 210, 203; 379/285, 346, 270, 277, 301, 321; 375/260, 267, 299, 296, 346, 347, 349, 351

(56) References Cited

U.S. PATENT DOCUMENTS

| 4,615,040 A | * | 9/1986 | Majoli et al. ................ 375/267 |
| 4,621,368 A | * | 11/1986 | Onoe et al. ..................... 375/40 |
| 5,268,938 A | * | 12/1993 | Feig et al. .................... 375/122 |
| 5,369,800 A | * | 11/1994 | Takagi et al. .................. 455/59 |
| 5,400,322 A | * | 3/1995 | Hant et al. ................... 370/468 |

(List continued on next page.)

FOREIGN PATENT DOCUMENTS

WO 9709812 3/1997

OTHER PUBLICATIONS

"A Multicarrier E1–HDSL Transceiver System with Coded Modulation", by Chow et al. Journal of European Trans. Issue No. 3, May/Jun. 1993, pp. 257–266.
"Overlapped Discrete Multitone Modulation for High Speed Copper Wire Communications", by Sandberg et al, IEEE Journal on Selected Areas in Communic/ vol.13, No.9, 12/95, 1571–1585.
"A Highly Efficient HF Modem with Adaptive Fading Control Algorithm" by Hirosaki et al, IEEE Global Telecommunications Conference '84, vol. 3, Nov. 26–29, 1984, pp. 1553–1557.
"Numerical Recipes in C", by Press et al, published by Cambridge University Press, paragraph 13:10 on pp. 591–606 entitled "Wavelet Transforms".

*Primary Examiner*—Douglas Olms
*Assistant Examiner*—Ken Vanderpute
(74) *Attorney, Agent, or Firm*—Ware, Fressola, Van Der Sluys & Adolphson LLP

(57) ABSTRACT

In a multicarrier transmission system, a transmitter (T, T') sends digital data packets (D) modulated on a set of carriers to a receiver (R, R'). A subset of the carriers constituting the set of carriers has frequencies (f1, f2, f3, f4) in predetermined frequency ranges (Amateur Radio Band) with high risk for being affected by narrowbanded interference (RFI), e.g. originating from radio amateur transmission. The data bits of the digital data packets (D) that are allocated to the subset of carriers having frequencies (f1, f2, f3, f4) within these predetermined frequency ranges (Amateur Radio Band), are allocated thereto in a redundant way. Via an allocation message (AM) communicated between the transmitter (T, T') and the receiver (R, R') both are aware of the redundancy in the bit allocations. The receiver (R, R') is capable of measuring the amount of narrowbanded interference (RFI) that affects each carrier within the subset of carriers that may be affected thereby, and can re-combine data bits allocated to carriers in this subset which carry redundant data bits so that interference immunity is improved.

8 Claims, 4 Drawing Sheets

U.S. PATENT DOCUMENTS

| | | | | |
|---|---|---|---|---|
| 5,479,447 A | * | 12/1995 | Chow et al. | 375/260 |
| 5,504,783 A | * | 4/1996 | Tomisato et al. | 375/267 |
| 5,673,290 A | * | 9/1997 | Coiffi | 370/210 |
| 5,680,388 A | * | 10/1997 | Kahre | 370/210 |
| 5,790,550 A | * | 8/1998 | Peeters | 370/480 |
| 5,809,030 A | * | 9/1998 | Mestdagh et al. | 370/480 |
| 5,812,599 A | * | 9/1998 | Van Kerckhove | 375/260 |
| 5,832,032 A | * | 11/1998 | Overbury | 375/285 |
| 5,914,933 A | * | 6/1999 | Cimini et al. | 370/208 |
| 5,949,796 A | * | 9/1999 | Kumar | 370/529 |
| 6,134,274 A | * | 10/2000 | Sankaranarayanan et al. | 375/295 |

* cited by examiner

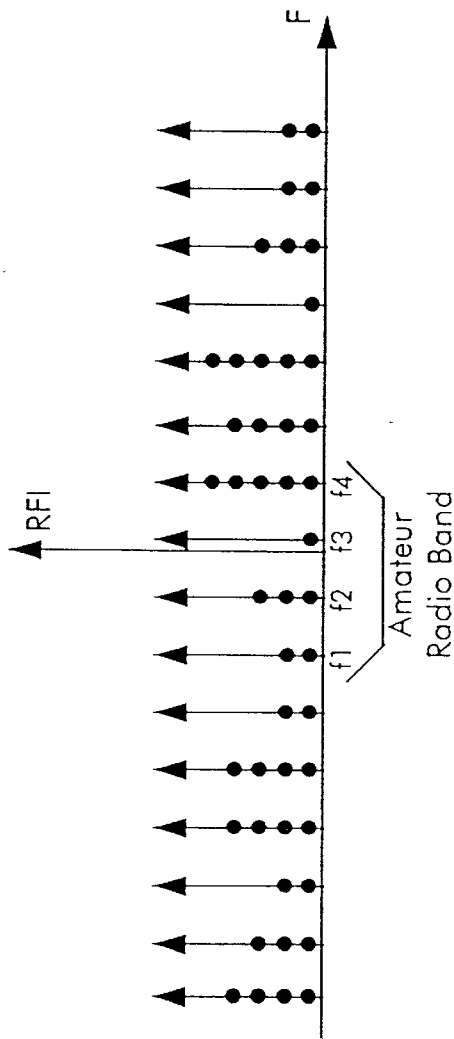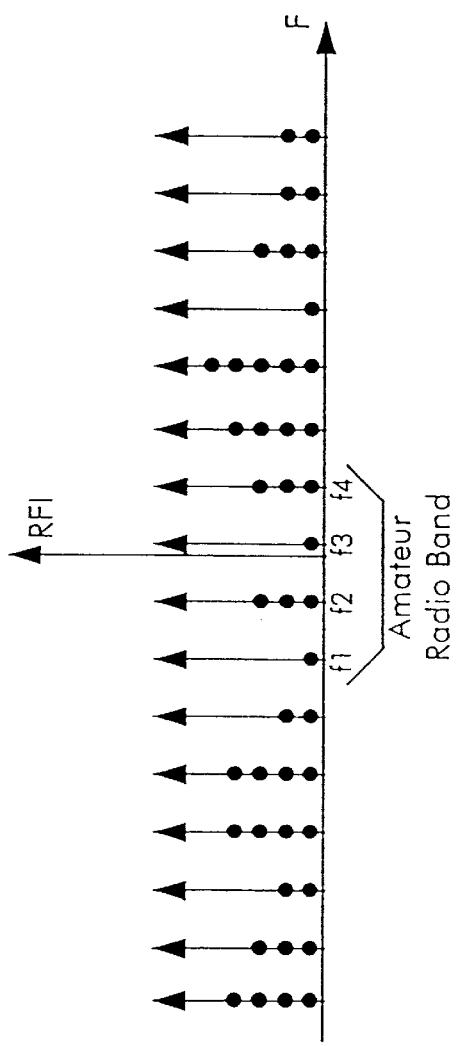
Fig. 4A (Prior Art)
Fig. 4B

US 6,351,473 B1

METHOD TO ALLOCATE DATA BITS, MULTI-CARRIER TRANSMITTER AND RECEIVER USING THE METHOD, AND RELATED ALLOCATION MESSAGE GENERATOR

TECHNICAL FIELD

The present invention relates to a method to allocate data bits of digital data packet to a set of carriers in a multicarrier transmission system wherein a set of carriers, after being modulated with the data bits, is transmitted from a transmitter from a transmitter to a receiver via a transmission link, a subset of the set of carriers having frequencies within predetermined frequency ranges (Amateur Radio Band) with high probability for being affected by narrowbanded interference compared to carriers having frequencies outside the predetermined frequency ranges (Amateur Radio Band). It is also directed to a multicarrier transmitter adapted to transform a sequence of digital data packets into multicarrier data symbols and to apply the multicarrier data symbols via an output terminal to a transmission link to be transmitted thereover. It is also direct to a multicarrier receiver adapted to transform multicarrier data symbols received from a transmission link via an input terminal into a sequence of digital data packets. It is still further directed to an allocation message generator adapted to generate an allocation message to be communicated between a multicarrier transmitter and a multicarrier receiver in a multicarrier transmission system wherein digital data packets are transmitted between the multicarrier transmitter and the multicarrier receiver via a transmission link after being modulated on a set of carriers, a subset of carriers constituting the set of carriers having frequencies within frequency ranges (Amateur Radio Band) with high probability for being affected by narrowband interference (RFI) compared to carriers having frequencies outside these frequency ranges (Amateur Radio Band), said allocation message.

BACKGROUND OF THE INVENTION

Such a method to allocate data bits and equipment adopted to perform such a method are already known in the art, e.g. from the article 'A Multicarrier E1-HDSL Transceiver System with Coded Modulation' from the authors Peter S. Chow, Naofal Al-Dhahir, John M. Cioffi and John A. C. Bingham. This article was published in the issue No. 3, May/June 1993 of the *Journal of European Transactions on Telecommunications and Related Technologies* (ETT), pages 257–266. Therein, a multicarrier transceiver system is described wherein digital data are modulated via Discrete Multi Tone (DMT) modulation on a set of carriers to be transmitted from a DMT transmitter to a DMT receiver via copper telephone lines. The block schemes of the DMT transmitter and DMT receiver are drawn in FIG. 4 and FIG. 5 on page 261 of the cited article respectively. In the DMT transmitter a bit allocation means, called a data bit encoder, allocates data bits of a digital data packet, called a block symbol, to the different carriers. The data bit encoder thereto uses formula (7) on page 260 of the article. A modulation means, i.e. the inverse fast Fourier transformer of FIG. 4, then modulates the data on the carriers where they are allocated to, to constitute the multicarrier symbols that are transmitted over the copper telephone line. FIG. 4A illustrates a possible constellation of data bits amongst carriers obtained by applying the known method. At the receiver's side, a fast Fourier transformer demodulates these multicarrier symbols, and the decoder which forms part of the DMT receiver drawn in FIG. 5 of the above mentioned article, retrieves from each carrier the exact amount of data bits modulated thereon and thus performs the role of bit de-allocation means. This de-allocation means obviously has to know how many bits are modulated on each one of the carriers so that it can easily retrieve the exact amount of data bits from each carrier. In the known system, the bit de-allocation means gets this knowledge during initialisation of the transceiver system. Indeed, as is stated on page 263, in lines 22–30 of the left column, the DMT transmitter and DMT receiver negotiate with respect to bit and energy allocation during initialisation. As is understood from paragraph 2.2 of the article of Peter S. Chow et al., more particularly from lines 28–34 in the right column on page 259, certain carrier frequencies may be plagued by narrowbanded or single-frequency disturbances. In FIG. 4A such a disturbance is represented by RFI. Forward error correction techniques, well-known in the art, can reduce the effect of such disturbances. Nevertheless, unrecoverable errors may still appear at the receiver's side. Thereto, Peter S. Chow et al. propose in their article the bitswapping solution: bit- and energy allocations are updated so that data bits are no longer transmitted via affected carriers. Such a re-allocation of data bits requires an additional communication between the DMT transmitter and DMT receiver, similar to the communication performed during initialisation, since both have to get aware of the new bit-allocations. Such a communication may be time-consuming and data bits may already be lost before the bits are swapped to less noisy carriers. Bitswapping thus may imply unrecoverable loss of information if it is seen as a solution for narrowbanded interference.

A problem similar to the just described one is known from the article 'Overlapped Discrete Multitone Modulation for High Speed Copper Wire Communications' from the authors Stuart D. Sandberg and Michael A. Tzonnes, an article which is published in the '*IEEE Journal on Selected Areas in Communications*', Vol. 73, No. 9, December 1995 on pages 1571–1585 thereof. This article also describes a Discrete Multi Tone (DMT) modulation system which differs from the system described by Peter S. Chow et al. in that wavelet modulation and demodulation techniques are used instead of Fourier transforms. The wavelet transformation is, similar to the Fourier transformation, a linear transformation which transforms a time domain vector into a vector in another domain. This other domain is defined by its base functions which are complex exponentials for the Fourier transformation, and which can be more complex functions, implemented by means of general filter banks such as the cosine modulated filter bank, of another wavelet transformation. More details with respect to the wavelet transformation are found in the book '*Numerical Recipes in C*', written by William H. Press, Saul A Teukolsky, William T. Vetterling and Brian P. Flannery and published by the Cambridge University Press, in paragraph 13.10 on pages 591–606 entitled '*Wavelet Transforms*'. As mentioned in the left column on page 1583 of the article of Sandberg and Tzannes, their multicarrier system may be disturbed by narrowbanded interference due to the presence of radio frequency signals. In other words, the transmission line may pick up signals broadcasted by radio amateur transmitters as a result of which some carriers in the multicarrier data symbols transported by this transmission line may be damaged. In their article, Sandberg and Tzannes prove that their system, thanks to the wavelet modulation and demodulation techniques, has an improved immunity for such narrowbanded interference compared to multicarrier systems using Fourier transform modulation and demodulation methods, due to the intrinsic better spectral containment of the carrier waveforms. Nevertheless, also in the system of Sandberg and Tzannes, unrecoverable errors still have to be solved by re-allocation of data bits.

SUMMARY OF THE INVENTION

An object of the present invention is to provide a method for allocating data bits to a set of carriers and related equipment of the above known type, but wherein unrecoverable loss of information due to narrowbanded interference and time-consuming communications of the above described type are avoided.

According to the invention, this object is achieved by a method to allocate data bits of digital data packets to a set of carriers in a multicarrier transmission system wherein the set of carriers, after being modulated with the data bits, is transmitted from a transmitter to a receiver via a transmission link, a subset of the set of carriers having frequencies within predetermined frequency ranges (Amateur Radio Band) with high probability for being affected by narrowbanded interference compared to carriers having frequencies outside the predetermined frequency ranges (Amateur Radio Band) wherein at least part of the data bits of the digital data packets that are allocated to carriers of the subset of carriers, are allocated in a redundant way.

The object is also achieved by a multicarrier transmitter adapted to transform a sequence of digital data packets into multicarrier data symbols and to apply the multicarrier data symbols via an output terminal to a transmission link to be transmitted thereover, the multicarrier transmitter including between an input terminal and an output terminal the cascade connection of a bit allocation means, adapted to allocate data bits of the digital data packets to carriers of a set of carriers whereon the data packets have to be modulated, a subset of a set of carriers having frequencies within predetermined frequency ranges (Amateur Radio Band) with high probability for being affected by narrowbanded interference compared to carriers having frequencies outside the predetermined frequency ranges (Amateur Radio Band); and modulation means adapted to modulate the data bits on the carriers where they are allocated to, to thereby constitute the multicarrier data symbols, wherein the bit allocation means is adapted to allocate data bits in a redundant way to the carriers in the subset of carriers having frequencies within the predetermined frequency ranges (Amateur Radio Band) with high probability for being affected by narrowbanded interference.

The object is still further achieved by a multicarrier receiver adapted to transform multicarrier data symbols received from a transmission link via an input terminal into a sequence of digital data packets, the multicarrier receiver including between the input terminal and an output terminal thereof the cascade connection of: demodulation means, adapted to demodulate the multicarrier data symbols from a set of carriers where they are modulated on, a subset of the set of carriers having frequencies within predetermined frequency ranges (Amateur Radio Band) with high probability for being affected by narrowbanded interference compared to carriers having frequencies outside these predetermined frequency ranges (Amateur Radio Band); and bit de-allocation means, adapted to retrieve from each carrier of the set of carriers the exact number of data bits that was modulated thereon, wherein the multicarrier receiver further includes: narrowbanded interference measurement means, adapted to measure for each carrier in the subset of carriers the amount of narrowbanded interference by which the carrier is affected; diversity means, an input of which is coupled to an output of the narrowbanded interference measurement means and respective outputs of which are coupled to a control input of the demodulation means and a control input of the bit de-allocation means, and adapted to decide which data bits amongst redundantly allocated data bits are taken for demodulation and re-combination; and further wherein: the demodulation means is adapted to demodulate the data bits taken by the diversity means; and the bit de-allocation means is adapted to retrieve and recombine the data bits taken by the diversity means.

The object is also achieved by an allocation message generator, adapted to generate an allocation message to be communicated between a multicarrier transmitter and a multicarrier receiver in a multicarrier transmission system wherein digital data packets are transmitted between the multicarrier transmitter and the multicarrier receiver via a transmission link after being modulated on a set of carriers, a subset of carriers constituting the set of carriers having frequencies within frequency ranges (Amateur Radio Band) with high probability for being affected by narrowbanded interference compared to carriers having frequencies outside these frequency ranges (Amateur Radio Band), the allocation message generator including: a carrier identifier generator, adapted to generate a first parameter referring to one carrier of the set of carriers where the allocation message is related to; a bit amount generator, adapted to generate a second parameter representing an amount of data bits that is allocated in the multicarrier transmitter to the carrier where the allocation message is related to; a power amount generator, adapted to generate a third parameter representing a power level at which the carrier where the allocation message is related to, is transmitted; and embedding means, respective inputs of which are coupled to outputs of the carrier identifier generator, the bit amount generator, and the power amount generator respectively, the embedding means being adapted to embed the first parameter, the second parameter and the third parameter in respective fields of the allocation message, wherein the allocation message generator further includes: a redundancy parameter generator, adopted to generate a fourth parameter indicating whether the carrier where the allocation message is related to, carries redundant information or not; and further wherein the embedding means is provided with an additional input whereto an output of the redundancy parameter generator is coupled, the embedding means being adapted to also embed the fourth parameter in a respective field of the allocation message.

Indeed, narrowbanded or single frequency interference such as due to radio amateur signals may swap from one frequency to another, but, in accordance to certain specifications, always stays within predetermined frequency ranges. As a result, only a limited number of carriers, those having frequencies within these specified ranges, may be affected by the narrowbanded interference. This limited number of carriers constitutes a subset of carriers which, according to the present invention, is protected by modulating data thereon in a redundant way. The same data bits may for instance be modulated two or three times on carriers which form part of the subset. Alternatively, a linear or more complex combination of data bits modulated on certain carriers may be modulated on other carriers. One can even think of an implementation of the present invention wherein data bits of some multicarrier data symbols are combined in a linear or more complex way, and wherein the combined data symbols are sent on other carriers as part of other multicarrier data symbols. The multicarrier receiver then can retrieve data bits which are unrecoverably affected from other carriers if one of the carriers is damaged. No additional communication between the multicarrier transmitter and receiver is required. The multicarrier receiver just has to be aware of the redundancy scheme used by the transmitter. In other words, the receiver has to know which data bits are duplicated on which carriers in the subset or how data bits were combined and modulated on other carriers. This is told to the receiver by simple allocation messages which are generated for each carrier by the allocation message generator according to the present invention. These messages are all transmitted during the initialisation procedure. Obviously, the data recovery improves if the level of redundancy increases, but, as will be explained later on, an increased redundancy level inevitably reduces the throughput capacity of the transmission line. Thus, there is a trade-off between narrowbanded interference immunity by redundant transmission of data and throughput capacity of the line.

An additional feature of the present invention is that, in a first low-complexity implementation thereof, each data bit allocated to a carrier of the subset that may be affected, is in copy allocated to another carrier of the subset.

Thus, whenever a data bit is unrecoverably affected by narrowbanded interference, a copy of this data bit can still be obtained by the receiver from another carrier. This is not valid for alternative implementations of the present method wherein for instance only important data bits modulated on carriers in the subset and not any data bit are given this level of protection.

Yet another feature of the present allocation method is that, still in this first particular implementation, the data bits allocated to carriers in the lower half of this subset are in copy allocated to carriers in the upper half of this subset.

In this way, the carriers to which data bits and their copies are allocated are separated over a certain distance on a frequency scale. The probability that both the data bits and their copies will be unrecoverably affected by narrowbanded interference is reduced compared to implementations of the present invention wherein carriers with neighboring frequencies carry the data bits and their copies. It has however to be noted that this implementation, wherein the carriers are chosen, one in the lower half and one in the upper half of the frequency bands, may not always be recommended, since it assumes that the carriers in the upper- and lower half of this subset more or less have the same capacity for carrying data bits. This capacity of a carrier is the maximum number of data bits that, given the power level at which the carrier is transmitted and the signal to noise ratio of the carrier measured at the receiver's side, is allowed to be allocated to this carrier. If the carriers in the upper half and lower half of the subset have great differences in capacities, part of the capacity of this half of the subset with the highest capacity for carrying data bits will not be used. A disadvantageous consequence thereof is a decreased throughput of the transmission line.

Furthermore, a feature of the present invention is that, still in this first implementation thereof, data bits allocated to a carrier with index k in the subset are in copy allocated to a carrier with index T+k, T being half the number of carriers constituting the subset.

In this way, the receiver can obtain all data bits from one single other carrier if a carrier is affected by narrowbanded interference and does not have to collect copies of the affected data bits from a plurality of other carriers. A person skilled in the art will recognise that the receiver complexity is reduced significantly in this case. In addition, the probability that both carriers carrying the data bits and their copies respectively, will be affected by the same narrowbanded interference, is minimised since there are always at least T−1 carriers in the set of carriers between these two carriers. Similar to what is explained already above, the capacity of the transmission line may be inefficiently used if carriers associated with each other do not have capacities for carrying data bits that are more or less equal.

Moreover, an additional feature of the present invention is that, in a second implementation thereof, carriers in the subset may be associated with each other, group by group, all carriers in one group carrying the same data bits.

Thus, the more carriers constitute one group and are modulated with the same data bits, the higher the protection against narrowbanded interference, however, the lower the throughput capacity of the transmission line. A person skilled in the art will understand that carriers constituting one group have to be selected carefully: their frequencies should be spread over a wide frequency range to have good protection, and their capacities for carrying data bits should be comparable so as to minimise throughput loss.

A third implementation of the present method uses a combination of data bits that are allocated to carriers in the subset of carriers and are also allocated to other carriers.

In this way, by combining data bits and transmitting the combination of the data bits over other carriers than those where the original data bits are sent over, redundant transmission can be achieved with a higher throughput capacity than by duplicating or triplicating the data bits. This advantageous throughput capacity however will be paid by a higher complexity in the receiver. The receiver has to be able of re-generating the original data bits from the different versions thereof that were sent.

An additional feature of the third implementation is that redundant information, such as combinations of data bits modulated on certain carriers, may be transmitted as part of later transmitted multicarrier data symbols, so that the probability of being damaged by interference is even more reduced.

An additional advantageous feature of the third implementation is, that.

Indeed, when data bits are linearly combined, the inverse operation also is a linear combination of the received data bits as a result of which the receiver complexity can be kept low.

Yet another feature of the present method is that the degree of redundancy for transmission of data bits on carriers in the affected range may depend on quality of service requirements.

In this way, data bits of services with strong bit error protection requirements, such as financial data transmission, or sensitive OAM (Operation And Maintenance) information like synchronisation information, with strong bit error requirements, may be sent with a high degree of redundancy so that their transmission is well-protected. The transmission of data bits of services such as speech or video on demand on the other hand is subjected to less severe bit error requirements. Consequently, to optimally use the capacity of the transmission line, it may be decided not to sent such data bits in a redundant way.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein:

FIGS. 4A and 4B represent bit allocation schemes related to the prior art method and the method according to the present invention respectively.

BEST MODE FOR CARRYING OUT THE INVENTION

Figure 1:
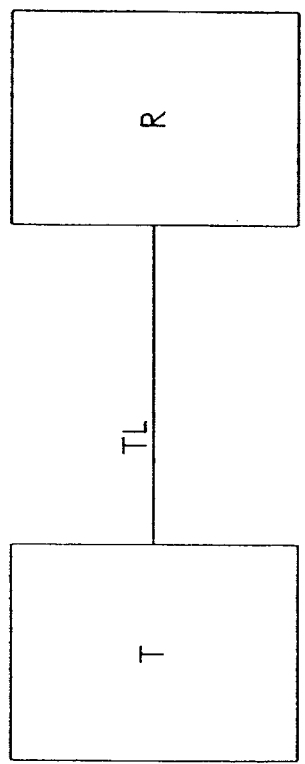
FIG. 1 represents a block scheme of a transmission system wherein an implementation of the method according to the present invention is applied.

In FIG. 1, a multicarrier transmitter T is coupled to a multicarrier receiver R via a copper telephone line TL. The transmitter T and receiver R in fact are transceivers capable of transmitting and receiving multicarrier data symbols and both thus have a similar structure with a transmitting part and a receiving part. To explain the technique of the present invention, it is sufficient to consider one-way traffic over the telephone line TL. This is the reason why one of the transceivers T and R is called a transmitter T whilst the other one is called a receiver R. Digital data are modulated on a set of carriers by transmitter T and in addition transmitted over the telephone line TL. If for instance the principles of ADSL (Asymmetric Digital Subscriber Line) as described in the ANSI Standard Specification T1E1.4 are respected, the digital data are grouped in packets named DMT (Discrete Multi Tone) symbols, modulated on a set of 256 carriers with equidistant frequencies and applied to the telephone line TL. This telephone line TL picks up radio amateur signals which interfere with the carriers that transport the DMT symbols. The radio amateur signals can charge from one frequency to another but, in accordance to national specifications, always stay within a well known frequency range. This frequency range may be a single frequency band as the one referred to by 'Amateur Radio Band' in FIG. 4A and FIG. 4B, or may comprise several separated frequency bands. In FIG. 4A and FIG. 4B, only four carriers, the carriers with frequencies f1, f2, f3 and f4, have frequencies within the range 'Amateur Radio Band'. These carriers are probably affected by the above mentioned radio amateur signals. Transmitter T is supposed to know the range 'Amateur Radio Band' and in a programmable or hardcoded way memorises that the carriers with frequencies f1, f2, f3 and f4 may be affected by radio interference in this range.

Figure 2:
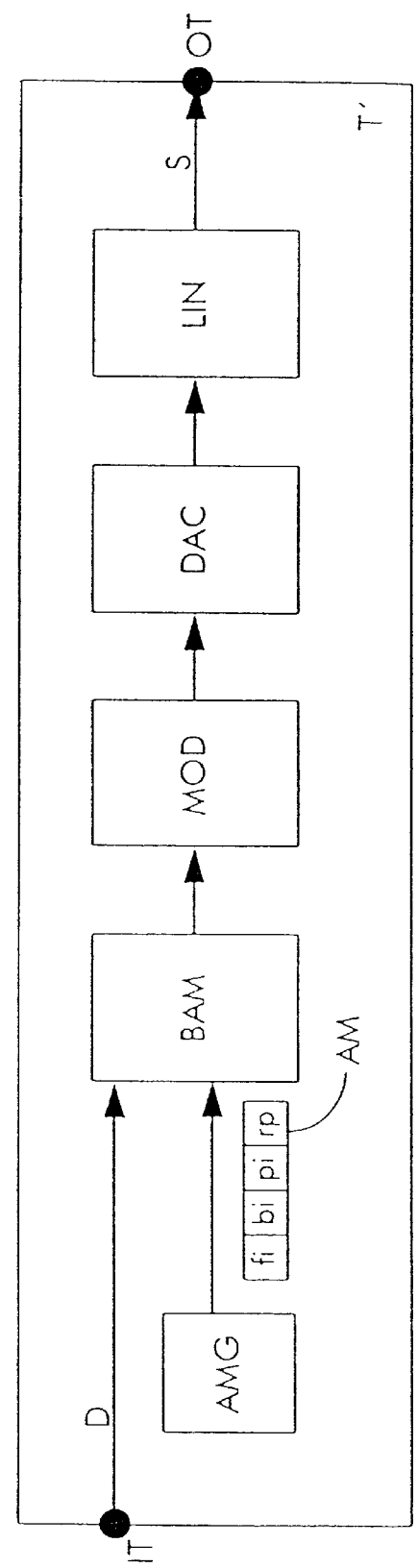
FIG. 2 represents a functional block scheme of an embodiment of the multicarrier transmitter T' according to the present invention.
Figure 3:
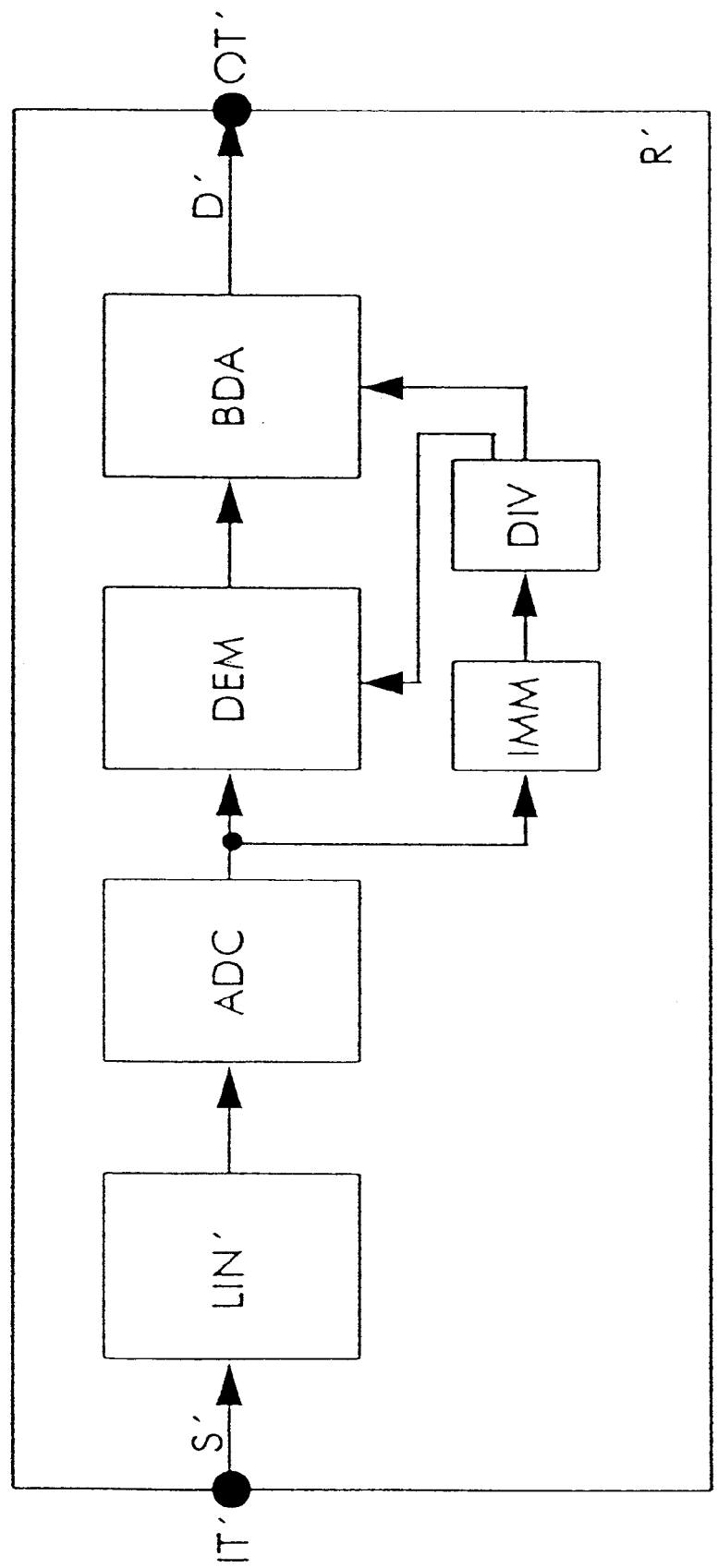
FIG. 3 represents a functional block scheme of an embodiment of the multicarrier receiver R' according to the present invention.

Transmitter T' in FIG. 2 and receiver R' in FIG. 3 are illustrated by a functional block scheme. Transmitter T' and receiver R' are able to transmit and receive respectively the above mentioned multicarrier data symbols and may replace transmitter T and receiver R in FIG. 1 since it is supposed that T' and R' are able to communicate with each other via the telephone line TL, drawn in FIG. 1.

Multicarrier transmitter T' includes a bit allocation means BAM, a modulator MOD, a digital to analogue converter DAC, and a line interface LIN. This bit allocation means BAM, the modulator MOD, the digital to analogue converter DAC and the line interface LIN are cascade connected between an input terminal IT and an output terminal OT of transmitter T'. The multicarrier transmitter T' further is equipped with an allocation message generator AMG whose output is coupled to a second input of the bit allocation means BAM. It has to be noted that instead of interconnecting IT and an output of AMG with respective inputs of BAM, a multiplexer may be inserted to first and second inputs of which IT and the output of AMG are coupled. An output of this multiplexer is then coupled to an input of BAM.

Multicarrier receiver R' in FIG. 3 also includes a line interface LIN', and further is provided with an analogue to digital converter ADC, a demodulator DEM, and a bit de-allocation means BDA which are all cascade connected between an input terminal IT' and an output terminal OT' of the receiver R'. In addition, the receiver R' is equipped with interference measuring means IMM and a diversity means DIV. An output of the analogue to digital converter ADC and an input of the interference measuring means IMM are interconnected, an output of the interference measuring means IMM is coupled to an input of the diversity means, and outputs of the diversity means are connected to control inputs of the demodulator DEM and of the bit de-allocation means BDA.

In the following paragraphs, the technique of the present invention is explained by describing in a detailed way the working of the different functional blocks BAM, MOD, DAC, LIN and AMG in the multicarrier transmitter T', and LIN', ADC, DEM, BDA, IMM and DIV in the multicarrier receiver R'. Thereto, the transmitter T' of FIG. 2 is supposed to send multicarrier data symbols to the receiver R' of FIG. 3 via the telephone line TL of FIG. 1.

Transmitter T', as already said, knows that the carriers with frequencies f1, f2, f3 and f4 constitute a subset of carriers that may be affected by narrowbanded interference. The bit allocation means BAM divides this subset into a lower part, comprising the carriers with frequencies f1 and f2, and an upper part, comprising the carriers with frequencies f3 and f4. The first carriers of these parts, i.e. the carrier with frequency f1 for the lower part and the carrier with frequency f3 for the upper part, are associated with each other, and similarly, the second carriers of these parts, i.e. the carrier with frequency f2 for the lower part and the carrier with frequency f4 for the upper part, are associated with each other. To associated carriers, such as f1 and f3 or f2 and f4, the bit allocation means BAM allocates identical data bits of an incoming data bit stream D. To determine the amount of data bits that is allocated to each one of the carriers, a communication is set up between the transmitter T' and receiver R' during an initialisation protocol. For each carrier in the set of carriers whereon the multicarrier data symbols are modulated, a signal to noise ratio (SNR) measurement is executed. The measured signal to noise ratio (SNR) values allow the bit allocation means BAM to determine the amount of data bits that is allowed to be allocated to each carrier. In other words, the capacity for carrying data bits is measured for each carrier. (The capacity of a single carrier, as is known by a person skilled in the art, can be increased by power boosting the carrier, i.e. by transmitting the carrier at a higher power level.) After determining the capacity of each carrier, the bit allocation means BAM then can allocate to each carrier the maximum amount of bits allowed to be allocated thereto. This is for instance done by a known transmitter, not shown in any of the figures, which generates the bit constellation drawn in FIG. 4A. Alternatively, the bit allocation means BAM con allocate a predetermined number of bits, for instance the amount of bits that constitutes one single DMT (Discrete Multi Tone) symbol in ADSL (Asymmetric Digital Subscriber Line), and can spread these bits over the carriers in the traditional way, i.e. optimising the individual signal-to-noise margins of the carriers if the number of bits to be allocated is below the number of bits that can be allocated, and minimising the needed power boosts if not. From FIG. 4A it is seen that the 16 carriers shown therein have a capacity of 4, 3, 2, 4, 4, 2, 2, 3, 1, 5, 4, 5, 1, 3, 2, and 2 bits respectively, without power boost, and thus also carry these amounts of bits in the known method. The carriers with frequencies f1, f2, f3, and f4 can carry 2, 3, 1 and 5 bits respectively if they are transmitted without power boost. As already explained, according to the present invention, the bit allocation means BAM of FIG. 2 decides to allocate identical data bits to the carriers with frequencies f1 and f3, and also to the carriers with frequencies f2 and f4. Without power boost, only one bit is allowed to be allocated to the carriers with frequencies f1 and f3 because the carrier with frequency f3 is not capable of transporting more bits. Thus, bit allocation means BAM allocates 1 bit to the carrier with frequency f1 and a copy of this bit to the carrier with frequency f3. Similarly, bit allocation means BAM allocates 3 data bits to the carriers with frequencies f2 and f4. Although carrier f4 is able to carry 5 data bits without power boost, carrier f2 is not capable to transport more than 3 data bits and determines the amount of data bits that will be allocated to both carriers. The data bits allocated to the carriers with frequencies f2 and f4 are again copies of each other. The complete constellation for the 16 carriers obtained by applying the present method, is shown in FIG. 4B. All carriers carry the same amount of bits as they are carrying in FIG. 4A except the carriers in the range Amateur Radio Band. Therein, 4 data bits are allocated twice instead of the 11 data bits which were allocated by the known method in FIG. 4A.

Referring to FIG. 2 again, the modulator MOD modulates the data bits on the carriers where they are allocated to, e.g. by QAM (Quadrature Amplitude Modulation), transforms the multicarrier data symbols from frequency domain to time domain by a modulation operation, which is in a preferred implementation, the inverse fast Fourier transform, and optionally extends the multicarrier data symbols with a cyclic prefix to compensate for intersymbol interference due to the length of the transmission line impulse response. The digital multicarrier data symbols are converted into an analogue signal by the digital to analogue converter DAC and adapted to be suitable for transmission over the telephone line TL by the line interface LIN. The signal S at the output of the line interface LIN is applied to the transmission line TL via output terminal OT.

Before transmitting the multicarrier data symbols to the receiver R', this receiver R' is told via allocation messages AM how many bits are allocated to each one of the carriers. The allocation message generator AMG of FIG. 2 thereto generates an allocation message AM for each carrier. Such an allocation message AM contains an identification of the frequency fi of the carrier where it is associated with, an amount of bits, bi, allocated to the carrier with this frequency fi, the power level or energy level, pi, at which the carrier with frequency fi is transmitted, and a single bit, rp, which is set when the carrier with frequency fi carries the same information as the carrier for which the immediately preceding allocation message was transmitted. For the complete range of carriers, the allocation messages are transmitted in increasing order of the amount of bits bi allocated thereto. Thus, since the carriers with frequencies f1 and f3 carry only one data bit, their associated allocation messages are transmitted first and have the following contents:

| | | | |
|---|---|---|---|
| f1 | 1 | 0.69 | 0 |
| and: | | | |
| f3 | 1 | 0.75 | 1 |

Later on, the allocation messages related to the carriers with frequencies f2 and f4 are transmitted. They have the following contents:

| | | | |
|---|---|---|---|
| f2 | 3 | 0.80 | 0 |
| and: | | | |
| f4 | 3 | 0.73 | 1 |

At the receiver's side, receiver R' interprets the allocation messages and understands that the carrier with frequency f3, transmitted at an energy level of 0.75 dB, carries 1 data bit which is a copy of the data bit that is modulated on the carrier with frequency f1, transmitted at a power level of 0.69 dB. Similarly, the receiver R' learns from the latter two allocation messages that the carrier with frequency f4, transmitted at a power level of 0.73 dB carries 3 data bits which are identical to the 3 data bits modulated on the carrier with frequency f2 which is transmitted at a power level of 0.80 dB.

Figure 5:
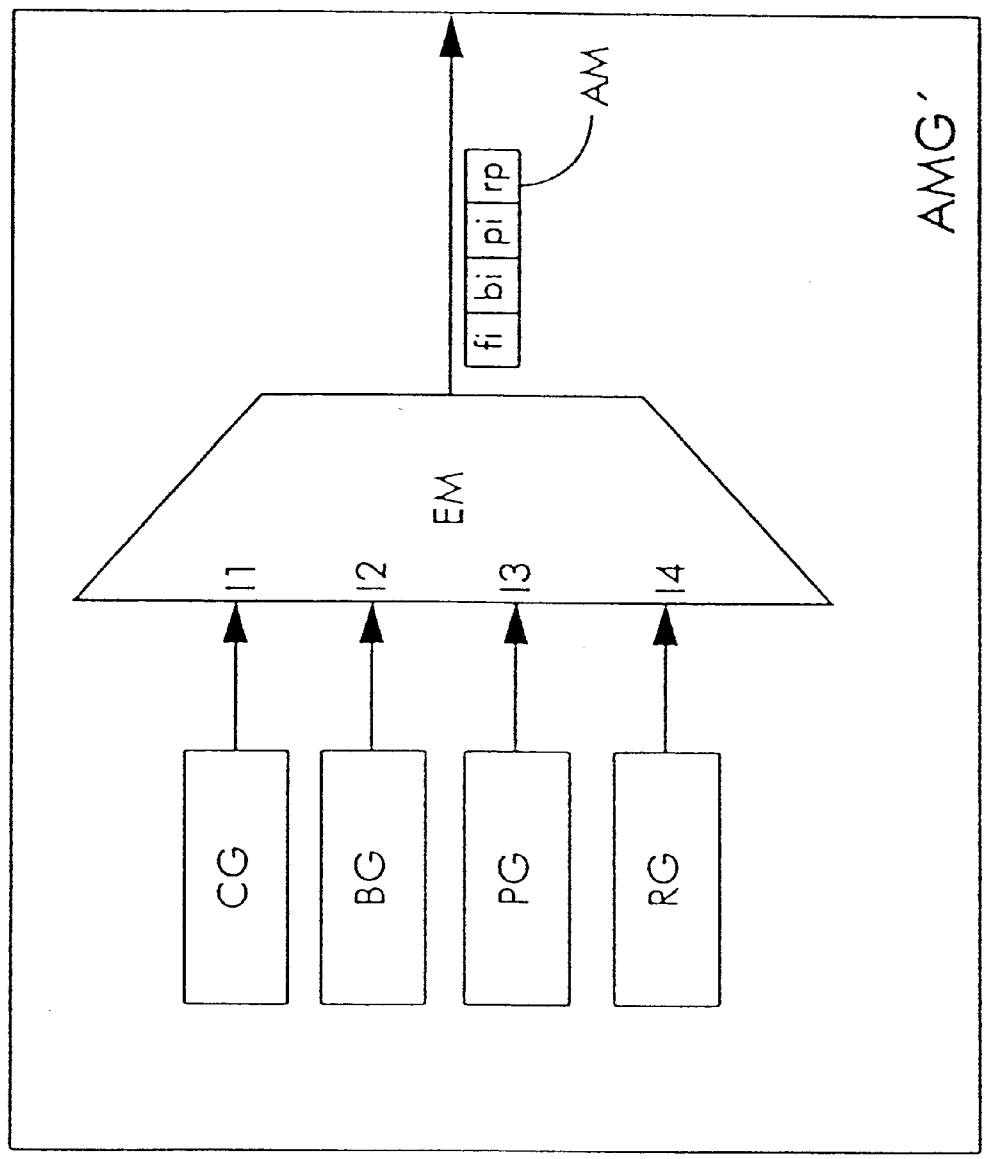
FIG. 5 represents a functional block scheme of an embodiment of the allocation message generator AMG' according to the present invention.

The functional blocks which form part of the allocation message generator AMG of FIG. 2, are shown in FIG. 5 where the allocation message generator is referred to by AMG'. A carrier identification generator CG, a bit amount generator BG, a power level generator PG and a redundancy information generator RG generate the information fi, bi, pi and rp respectively to be embedded in the fields of an allocation message AM. An embedder EM constitutes the allocation message AM and fills the respective fields with the information generated by the carrier identification generator CG, the bit amount generator BG, the power level generator PG and the redundancy information generator RG. Via the bit allocation means BAM where the allocation messages AM are included in the bitstream or directly mapped on a specific carrier, the modulation means MOD, the digital to analogue converter DAC and the line interface LIN in FIG. 2, the allocation messages AM are transformed into analogue signals suitable for transmission over the telephone line TL of FIG. 1.

By interpreting the allocation messages, the multicarrier receiver R' knows that part of the data bits are transmitted twice. The receiver R' now can demodulate the data bits. The line interface means LIN' and analogue to digital converter ADC adapt the signal S' transported over the telephone line TL of FIG. 1 and received via input terminal IT', and transform this signal S' into multicarrier digital data symbols. The interference measurement means IMM determines for all carriers that transport redundantly transmitted data bits (the carriers with frequencies f1, f2, f3 and f4 in the above described example), the amount of narrowbanded interference that affects these carriers. The measured interference values are then applied to the diversity means DIV which manages the re-combination of the data bits in an optimal way. The diversity means DIV in other words decides which bits shall be taken into account and controls the demodulator DEM and bit de-allocation means BDA so that the re-combined bits appear at the output OT' of the receiver R'. The way wherein the data bits are re-combined can take several forms. Selection diversity for instance implies that the bits which are transmitted on carriers with the best estimated signal to noise ratio (SNR) are taken for demodulation. A preferred cost-effective implementation of the invention should use selection diversity since it is close to optimal when the SNR differs significantly for different versions of the data bits, and it does not require a high receiver complexity. In FIG. 4A and FIG. 4B, it is assumed that a radio amateur signal RFI is disturbing the transmission at a frequency between f2 and f3. The effect of this interferer RFI on the carriers with frequencies f2 and f3 will be higher than the impact on the carriers with frequencies f4 and f1 respectively. Consequently, the interference measuring means IMM measures a higher affection for the carriers with frequencies f3 and f2 than for the carriers with frequencies f1 and f4 respectively. When the measured interference values are applied to the diversity means DIV, this diversity means DIV decides to retrieve the data bits transmitted in the affected range from the carrier with frequency f1 instead of the carrier with frequency f3, and from the carrier with frequency f4 instead of the carrier with frequency f2 in case of selection diversity. Alternatively, instant selection diversity may be applied. This means that amongst different versions of information symbols, the information symbol which is closest to a decision point of a constellation diagram is taken for demodulation. Another alternative diversity method is called 'Maximal Ratio Combining'. Therein, the information symbol that is taken for demodulation is calculated as a linear combination of different information symbol versions which are each weighted by a coefficient equal to the SNR of that version divided by the sum of the SNR's of all information symbol versions. Yet, in another alternative diversity method named 'Equal Gain Combining', the information symbol that is taken for demodulation is calculated as the average of the different versions of that information symbol. The preferred cost-effective version of the present invention, as already described above, uses selection diversity for complexity reasons.

The demodulator DEM extracts the cyclic prefix from the transmitted multicarrier symbols, fast Fourier transforms the symbols to obtain their frequency domain representation from the time domain representation and demodulates, e.g. by QAM demodulation, the data from the carriers. Under control of the diversity means DIV, the bit de-allocation means BDA retrieves the correct amount of bits from each carrier. Thus, in the affected range, 'Amateur Radio Band', zero bits are retrieved from the carriers with frequencies f2 and f3, one bit is retrieved from the carrier with frequency f1, and 3 bits are retrieved from the carrier with frequency f4. The retrieved bits leave the receiver R' via output terminal OT'.

A first remark is that the above description of an embodiment of the present invention is limited to describing the functions performed by the different blocks drawn in the figures. From this functional description, a person skilled in the art can derive how to implement each one of the drawn blocks.

A further remark is that, although the data in the above described embodiment are transported over a telephone line TL, the applicability of the present invention is not restricted by the transmission medium via which the data are transported. In particular, any connection between a transmitter T and a receiver R, e.g. a cable connection, a satellite connection, a radio link through the air, and so on, may be affected by narrowbanded interference, and thus can be protected by the method according to the present invention if the data are modulated on a set of carriers. The invention also is not only related to ADSL (Asymmetric Digital Subscriber Line) or similar techniques wherein DMT (Discrete Multi Tone) modulation is used. A person skilled in the art will be able to adopt the above described embodiment for example so that it is applicable to systems wherein DWMT (Discrete Wavelet Multi Tone) modulation is used. Therein, the above mentioned Fourier transform and inverse Fourier transform are replaced by wavelet transformations.

It is further noticed that the origin of the narrowbanded interference is of no importance for applicability of the present invention. Whether the disturbing signals are transmitted by a radio amateur, as supposed in the above described example, by a taxi, or by the police, or are caused by metallic noise as in the above cited article from Peter S. Chow, or are originating from yet another source is not relevant. Whenever a transmitter T expects that some of the carriers whereon data have to be modulated, may be affected by narrowbanded interference, he can protect the data bits transmitted via these carriers by transmitting these data bits in a redundant way. Carriers laying in the distress bands for instance also may be protected this way. Via the allocation messages, the receiver R is told which carriers are modulated with the duplicates of the data bits.

Another remark is that the modulation type also is irrelevant with respect to applicability of the present invention. In the above described embodiment, data are modulated on and demodulated from the set of carriers via QAM modulation and demodulation respectively. Alternatively, data may be modulated by phase modulation, frequency modulation, PSK (Phase Shift Keying) or any other modulation technique.

In the above described embodiment, any data bit transmitted in the frequency range that may be affected is transmitted twice. As a result, even if 50 percent of the carriers in this range are distorted by interference, all data can still be retrieved by the receiver R'. Obviously, higher or lower levels of protection are obtained by modifying the redundancy scheme. Data bits may be transmitted 3 or 4 times to the receiver, data bits may be combined in a linear or more complex way, and some of the data bits may be excluded for redundant transmission since loss thereof has no large impact on the performance of the system. The redundancy scheme, still in alternative versions of the present invention, may be optimised with respect to throughput of the transmission line. Copies of data bits that are modulated on carrier f1 do not necessarily have to be allocated to one single other carrier, but may be distributed over more than one other carrier. In this way, the carriers can be filled better. A disadvantage however is that in such implementations of the present invention, the contents of the allocation messages and the means in the receiver R which have to interpret these allocation messages become more complex. An improved throughput of the transmission line can also be obtained by allocating additional data bits to each carrier which can carry more bits than the duplicates of its associated carrier. In the above described example, f1 and f4 are such carriers.

It is also noticed that, in yet another implementation of the present invention, data bits may be duplicated and modulated on carriers with frequencies outside the range that is affected by narrowbanded interference.

While the principles of the invention have been described above in connection with specific apparatus, it has to be clearly understood that this description is made only by way of example and not as a limitation on the scope of the invention.

What is claimed is:

1. A method to allocate data bits of digital data packets (D) to a set of carriers in a multicarrier transmission system wherein said set of carriers, after being modulated with said data bits (D), is transmitted from a transmitter (T, T') to a receiver (R, R') via a transmission link (TL), a subset of said set of carriers having frequencies (f1, f2, f3, f4) within predetermined frequency ranges with high probability for being affected by narrowbanded interference (RFI) compared to carriers having frequencies outside said predetermined frequency ranges, at least part of the data bits of said digital data packets (D) that are allocated to carriers of said subset of carriers are allocated in a redundant way to other carriers, each said data bit that is allocated to a carrier in the lower half of said subset, said lower half being constituted by half the number of said carriers forming part of said subset having the lowest frequencies (f1, f2) therein, is also allocated to a carrier in the upper half of said subset, said upper half being constituted by half the number of said carriers forming part of said subset having the highest frequencies (f3, f4) therein, characterised in that, within said subset of carriers, each data bit that is allocated to a carrier with index k is also allocated to a carrier with index T+k, T being half the number of carriers forming part of said subset of carriers.

2. A method to allocate data bits of digital data packets (D) to a set of carriers in a multicarrier transmission system wherein said set of carriers, after being modulated with said data bits (D), is transmitted from a transmitter (T, T') to a receiver (R, R') via a transmission link (TL), a subset of said set of carriers having frequencies (f1, f2, f3, f4) within predetermined frequency ranges with high probability for being affected by narrowbanded interference (RFI) compared to carriers having frequencies outside said predetermined frequency ranges, at least part of the data bits of said digital data packets (D) that are allocated to carriers of said subset of carriers are allocated in a redundant way to other carriers, characterised in that each carrier of said subset is associated with at least one second carrier of said subset, said data bits being allocated to said carrier being identical to said data bits allocated to each one of said at least one associated second carrier, and the number of data bits being allocated to each one of said carrier and said at least one associated second carrier being equal to the minimum one of maximum numbers of data bits that is allowed to be allocated to said carrier or said at least one associated second carrier.

3. A method to allocate data bits of digital data packets (D) to a set of carriers in a multicarrier transmission system wherein said set of carriers, after being modulated with said data bits (D), is transmitted from a transmitter (T, T') to a receiver (R, R') via a transmission link (TL), a subset of said set of carriers having frequencies (f1, f2, f3, f4) within predetermined frequency ranges with high probability for being affected by narrowbanded interference (RFI) compared to carriers having frequencies outside said predetermined frequency ranges, at least part of the data bits of said digital data packets (D) that are allocated to carriers of said subset of carriers are allocated in a redundant way to other carriers, characterised in that a combination of said data bits that are allocated to carriers in said subset of carriers is allocated to other carriers as part of other multicarrier data symbols.

4. A method to allocate data bits of digital data packets (D) to a set of carriers in a multicarrier transmission system wherein said set of carriers, after being modulated with said data bits (D), is transmitted from a transmitter (T, T') to a receiver (R, R') via a transmission link (TL), a subset of said set of carriers having frequencies (f1, f2, f3, f4) within predetermined frequency ranges with high probability for being affected by narrowbanded interference (RFI) compared to carriers having frequencies outside said predetermined frequency ranges, at least part of the data bits of said digital data packets (D) that are allocated to carriers of said subset of carriers are allocated in a redundant way to other carriers, characterised in that a combination of said data bits that are allocated to carriers in said subset of carriers is a linear combination.

5. A multicarrier receiver (R, R') adapted to transform multicarrier data symbols (S') received from a transmission link (TL) via an input terminal (IT') into a sequence of digital data packets (D'), said multicarrier receiver (R, R') including between said input terminal (IT') and an output terminal (OT') thereof the cascade connection of:

a. demodulation means (DEM), adapted to demodulate said multicarrier data symbols (S') from a set of carriers where they are modulated on, a subset of said set of carriers having frequencies (f1, f2, f3, f4) within predetermined frequency ranges with high probability for being affected by narrowbanded interference (RFI) compared to carriers having frequencies outside these predetermined frequency ranges; and b. bit de-allocation means (BDA), adapted to retrieve from each carrier of said set of carriers the exact number of data bits that was modulated thereon, characterised in that said multicarrier receiver (R, R') further includes:

c. narrowbanded interference measurement means (IMM), adapted to measure for each carrier in said subset of carriers the amount of narrowbanded interference (RFI) by which said carrier is affected;

d. diversity means (DIV), an input of which is coupled to an output of said narrowbanded interference measurement means (IMM) and respective outputs of which are coupled to a control input of said demodulation means (DEM) and a control input of said bit de-allocation means (BDA), and adapted to decide which data bits amongst redundantly allocated data bits are taken for demodulation and re-combination; and further characterised in that:

e. said demodulation means (DEM) is adapted to demodulate said data bits taken by said diversity means (DIV);

f. said bit de-allocation means (BDA) is adapted to retrieve and re-combine said data bits taken by said diversity means (DIV).

6. An allocation message generator (AMG, AMG'), adapted to generate an allocation message (AM) to be communicated between a multicarrier transmitter (T, T') and a multicarrier receiver (R, R') in a multicarrier transmission system wherein digital data packets (D) will be transmitted between said multicarrier transmitter (T, T') and said multicarrier receiver (R, R') via a transmission link (TL) after being modulated on a set of carriers, a subset of carriers constituting said set of carriers having frequencies (f1, f2, f3, f4) within frequency ranges [(Amateur Radio Band)] with high probability for being affected by narrowbanded interference (RFI) compared to carriers having frequencies outside these frequency ranges, said allocation message generator (AMG, AMG') including:

a. a carrier identifier generator (CG), adapted to generate a first parameter (fi) referring to one carrier of said set of carriers where said allocation message (AM) is related to;

b. a bit amount generator (BG), adapted to generate a second parameter (bi) representing an amount of data bits that is allocated in said multicarrier transmitter (T, T') to said carrier where said allocation message (AM) is related to;

c. a power amount generator (PG), adapted to generate a third parameter (pi) representing a power level at which said carrier where said allocation message (AM) is related to, is transmitted; and d. embedding means (EM), respective inputs (I1, I2, I3) of which are coupled to outputs of said carrier identifier generator (CG), said bit amount generator (BG), and said power amount generator (PG) respectively, said embedding means (EM) being adapted to embed said first parameter (fi), said second parameter (bi) and said third parameter (pi) in respective fields of said allocation message (AM), characterised in that said allocation message generator (AMG, AMG') further includes:

e. a redundancy parameter generator (RG), adapted to generate a fourth parameter (rp) indicating whether said carrier where said allocation message (AM) is related to, carries redundant information or not; and further characterised in that f. said embedding means (EM) is provided with an additional input (I4) whereto an output of said redundancy parameter generator (RG) is coupled, said embedding means (EM) being adapted to embed also said fourth parameter (rp) in a respective field of said allocation message (AM).

7. A method to allocate data bits of digital data packets (D) to a set of carriers in a multicarrier transmission system wherein said set of carriers, after being modulated with said data bits (D), is transmitted from a transmitter (T, T') to a receiver (R, R') via a transmission link (TL), a subset of said set of carriers having frequencies (f1, f2, f3, f4) within predetermined frequency ranges with high probability for being affected by narrowbanded interference (RFI) compared to carriers having frequencies outside said predetermined frequency ranges, at least part of the data bits of said digital data packets (D) that are allocated to carriers of said subset of carriers are allocated in a redundant way to other carriers, characterised in that the set of carriers and the other carriers are part of a multicarrier data symbol.

8. A multicarrier transmitter (T, T') adapted to transform a sequence of digital data packets (D) into multicarrier data symbols (S) and to apply said multicarrier data symbols (S) via an output terminal (OT) to a transmission link (TL) to be transmitted thereover, said multicarrier transmitter (T, T') including between an input terminal (IT) and said output terminal (OT) the cascade connection of:

a. bit allocation means (BAM), adapted to allocated data bits of said digital data packets (D) to carriers of a set of carriers whereon said data packets (D) have to be modulated, a subset of said set of carriers having frequencies (f1, f2, f3, f4) within predetermined frequency ranges with high probability for being affected by narrowbanded interference (RFI) compared to carriers having frequencies outside said predetermined frequency ranges; and b. modulation means (MOD) adapted to modulate said data bits on said carriers where they are allocated to, to thereby constitute said multicarrier data symbols (S), said bit allocation means (BAM) is adapted to allocate data bits in a redundant way to other carriers than said carriers in said subset of carriers having frequencies (f1, f2, f3, f4) within said predetermined frequency ranges with high probability for being affected by narrowbanded interference (RFI), characterised in that said carriers and said subset of carriers are part of a multicarrier data symbol.

* * * * *

UNITED STATES PATENT AND TRADEMARK OFFICE
CERTIFICATE OF CORRECTION

PATENT NO. : 6,351,473 B1
DATED : February 26, 2002
INVENTOR(S) : P. Reusens et al.

It is certified that error appears in the above-identified patent and that said Letters Patent is hereby corrected as shown below:

<u>Column 14,</u>
Line 63, "[ (Amateur Radio Band) ]" should be deleted.

Signed and Sealed this

Fifteenth Day of October, 2002

Attest:

JAMES E. ROGAN
Attesting Officer    Director of the United States Patent and Trademark Office